(12) United States Patent
Sankaranarayanan et al.

(10) Patent No.: US 8,352,222 B2
(45) Date of Patent: Jan. 8, 2013

(54) METHODS AND SYSTEMS FOR EFFICIENT ANALYSIS OF HYBRID SYSTEMS USING TEMPLATE POLYHEDRA

(75) Inventors: Sriram Sankaranarayanan, Plainsboro, NJ (US); Franjo Ivancic, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 1042 days.

(21) Appl. No.: 12/236,071

(22) Filed: Sep. 23, 2008

(65) Prior Publication Data

US 2009/0094004 A1    Apr. 9, 2009

Related U.S. Application Data

(60) Provisional application No. 60/977,170, filed on Oct. 3, 2007.

(51) Int. Cl.
*G06F 17/10* (2006.01)
*G06F 7/60* (2006.01)
*G06F 7/00* (2006.01)
*H03K 3/00* (2006.01)
*G06G 7/00* (2006.01)
*G06E 3/00* (2006.01)

(52) U.S. Cl. ............ 703/2; 327/199; 708/800; 708/821; 708/854

(58) Field of Classification Search ...................... 703/2; 708/800–854; 327/199
See application file for complete search history.

(56) References Cited

U.S. PATENT DOCUMENTS 6,581,048 B1 * 6/2003 Werbos ............................ 706/23
2007/0271204 A1 * 11/2007 Jiang ................................ 706/6

OTHER PUBLICATIONS

Sriram Sankaranarayanan, "Constructing Invariants for Hybrid Systems", Springer-Verlag 2004.*
Sriram Sankaranarayanan, "Fixec Point Iteration for Computing the Time Elapse Operator", Spring-Verlag 2006.*
Stephane Gaubert, "Static Analysis by Policy Iteration on Relational Domains", Spring-Verlag, Jul. 2007.*
Alongkrit Chutinan, "Verification of Polyhedral-Invariant Hybrid Automata Using Polygonal Flow Pipe Approximation", 1999.*
Bruce H. Krogh, "Reachability Analysis and Verification", Jul. 25, 2007.*

(Continued)

*Primary Examiner* — David Silver
*Assistant Examiner* — Angel Calle
(74) *Attorney, Agent, or Firm* — James Bitetto; Joseph Kolodka

(57) ABSTRACT

In accordance with aspects of the present principles, an over-approximation of reachable states of a hybrid system may be determined by utilizing template polyhedra. Policy iteration may be utilized to obtain an over-approximation of reachable states in the form of a relaxed invariant based upon template polyhedra expressions. The relaxed invariant may be used to construct a flowpipe to refine the over-approximation and thereby determine the reachable states of the hybrid system.

10 Claims, 3 Drawing Sheets

OTHER PUBLICATIONS

Eugene Asarin, NPL, "Recent Progress in Continuous and Hybrid Reachability Analysis", 2006.*

B. Izaias Silva, NPL, "Modeling and Verifying Hybrid Dynamic Systems Using CheckMate", 2000.*

Sumit K. Jha, NPL, "Reachability for linear Hybrid Automata Using Iterative Relaxation Abstraction", May 2007.*

Bruce H. Krogh, NPL, "Reachability Analysis and Verification", Jul. 2007.*

Asarin et al.; The d/dt Tool for Verification of Hybrid Systems; CAV 2002; LNCS 2404; Springer-Verlag, Berlin, Heidelberg; 2002; pp. 365-370.

Chutinan et al.; Computing Polyhedral Approximations to Flow Pipes or Dynamic Systems; Proceedings of the 37th IEEE Conf. on Decision & Control; Tampa, FL; USA; Dec. 1998; pp. 2089-2094.

Gaubert et al.; Static Analysis by Policy Iteration on Relational Domains; ESOP 2007; LNCS 4421; Springer-Verlag, Berlin, Heidelberg; 2007; pp. 237-252.

Gawlitza et al.; Precise Relational Invariants Through Strategy Iteration; CSL 2007; LNCS 4646; Springer-Verlag, Berlin, Heidelberg; 2007; pp. 23-40.

Sankaranarayanan et al.; Fixed Point Iteration for Computing the Time Elapse Operator; HSCC 2006; LNCS 3927; Springer-Verlag, Berlin, Heidelberg; 2006; pp. 537-551.

Sankaranarayanan et al.; Symbolic Model Checking of Hybrid Systems Using Template Polyhedra; TACAS 2008; LNCS 4963; Springer-Verlag, Berlin, Heidelberg; 2008; pp. 188-202.

Silva et al.; Modeling and Verifying Hybrid Dynamic Systems Using CheckMate; ADPM 2000; pp. 1-7.

* cited by examiner

METHODS AND SYSTEMS FOR EFFICIENT ANALYSIS OF HYBRID SYSTEMS USING TEMPLATE POLYHEDRA

RELATED APPLICATION INFORMATION

This application claims priority to provisional application serial No. 60/977,170 filed on Oct. 3, 2007, incorporated herein by reference.

BACKGROUND

1. Technical Field

The present invention generally relates to reachability analysis for hybrid systems and, more particularly, to systems and methods for determining reachable states of a hybrid system by employing template polyhedra.

2. Description of the Related Art

In general, hybrid systems verification, even for simple systems, have presented a complex and difficult challenge. Too coarse an approximation may not enable proving the property of interest while analytic solutions are hard to obtain. Numerous approaches have been employed in the past to solve reachability queries, of which a few related approaches are mentioned below.

One such approach includes using polyhedra to determine reachable states of rectangular hybrid systems, as applied by the "HyTech" tool. More complex dynamics have been handled by abstraction. Other approaches deal with systems having complex dynamics by symbolically integrating them. For example, computing flowpipe segments by optimizing the bounding functions using a non-convex optimization problem has been employed in some known polyhedral flowpipe approximation approaches. In addition, approaches have included constructing ellipsoidal approximations; using level-set methods; using orthogonal polyhedra and face lifting; and generating approximations to a flowpipe based on quantifier elimination over the reals along with Taylor series expansions.

Additionally, other techniques for proving safety of a hybrid system by symbolically integrating its dynamics have been presented. Recently, symbolic techniques for generating reachable regions without the use of an explicit flowpipe approximation have been proposed, including the generation of polynomial equality invariants for systems with polynomial dynamics. These techniques can handle nonlinear systems beyond the reach of many related techniques, but the theory has so far been restricted to equality invariants. Further, a method for the synthesis of barrier functions (inequalities) has been proposed to justify invariants of nonlinear systems using convex optimization. These barrier functions are generated by solving equations on the unknown coefficients of a parametric polynomial.

The reachability problem for autonomous linear systems has also been solved by resorting to a series of geometric programs. Further, zonotopes have been used to construct flowpipes for uncertain linear systems. A different approach solves the reachability problem for hybrid systems by repeatedly subdividing the invariant region and approximating the dynamics inside each subdivision by piece-wise constant dynamics.

Turning now to known uses of policy iteration and invariants, the concept of a relaxed invariant used in a policy iteration scheme first appeared in SANKARANARAYANAN, S., SIPMA, H. B., AND MANNA, Z., Fixed point iteration for computing the time-elapse operator, in *Hybrid Systems: Computation and Control (HSCC* 2006), to appear (2006), Lecture Notes in Computer Science, Springer-Verlag. The invariant was computed using polyhedra as the fixed point of a refinement operator over cones of functions. A widening heuristic was used to force convergence.

In addition, invariants have been computed in static analysis of programs by using template polyhedra. For example, boxes have been used to represent sets of states in the interval domain. Similarly, template polyhedron of the form $\wedge \pm x_i \pm x_j \leq c$ have been used in the octagon domain. General template polyhedra have also been used to represent sets of states. Recently, techniques such as policy iteration and strategy iteration have been employed to compute the least fixed point for the interval, octagon and the template polyhedra domain.

Template polyhedra have also appeared implicitly in the work of Chutinan and Krogh, which is a part of the Checkmate tool. SILVA, B., RICHESON, K., KROGH, B. H., AND CHUTINAN, A. Modeling and verification of hybrid dynamical system using checkmate, in *ADPM* 2000 (2000). Their approach chooses a series of bounding half-spaces (affine functions) $g_1, \ldots, g_m$ to compute a given flowpipe segment for a time instance. The resulting flowpipe segment is expressed in terms of a template polyhedron $\wedge_i g_i \leq c_i$.

It should also be noted, regarding set-valued integration, known techniques apply numerical integration schemes by using analysis over set valued functions and include schemes that are analogous to popular numerical integration schemes such as Runge-Kutta. However, the sets used in these schemes are arbitrary and not, as such, restricted to intersections of bounding half-spaces.

Returning to known hybrid system verification methods discussed above, there has typically been a trade-off between expressiveness and tractability. Polyhedra have been widely used to represent sets of states for the verification of safety as well as liveness properties. However, the complexity of the basic algorithms involving polyhedra such as convex hull, post condition across discrete transitions and flowpipe construction is worst-case exponential. In practice, this fact has limited the usefulness of verification tools for hybrid systems. Therefore, approaches to verifying systems have been based on restricted forms of polyhedra such as orthogonal polyhedra and zonotopes. Likewise, predicate abstraction, a popular technique for verifying systems, uses boolean combinations of a given set of predicates $p_1, \ldots p_m$, to represent sets of states.

Furthermore, existing solutions to hybrid systems verification are limited by two aspects: (a) the number of discrete modes in the system and (b) the number of continuous variables. The number of continuous variables and the complexity of continuous dynamics in hybrid systems is a principal challenge in the verification and analysis of such systems. Although existing techniques seem to yield sufficient results for continuous systems, such as techniques employing zonotopes, for example, discussed above, they are difficult to apply to systems in which the number of modes is large.

Accordingly, there is a need for a more efficient means of determining over-approximations of reachable states of hybrid systems. In addition, there is also a need for an approach to determining over-approximations of reachable states of hybrid systems that may be applied to large systems with a substantial number of modes and continuous variables.

SUMMARY

Aspects of the present principles address the deficiencies of the prior art by employing a novel approach that uses policy iteration to compute flowpipes composed of template polyhedra. In accordance with aspects of the present principles, an efficient means for performing operations such as intersection, union and post-condition (e.g., image) across discrete transitions may be performed using template polyhedra. Furthermore, the operations may be performed without using vertex or facet enumeration. Moreover, in accordance with aspects of the present principles, repeated linear optimization queries may be applied and solved efficiently for systems having a large number of modes and continuous variables.

In one or more implementations of the present principles, techniques may be applied for verification of hybrid systems using template polyhedra, which are polyhedra whose inequalities have fixed expressions, allowing constants to vary. Other exemplary applications of the present principles include computing likely paths leading to property violations of a hybrid system, instantiating parameters in a system description to guarantee safe operations, and generating finite state abstractions of a given infinite state hybrid system.

According to one or more implementations of the present principles, over-approximations to the reachable states of a hybrid system using template polyhedra may be constructed using a hybrid system description and a set of input template linear expressions, from which constraints of the template polyhedra may be drawn. Policy iteration may be employed to compute a template polyhedron that is guaranteed to be a safe over-approximation of a flowpipe. Further, the result of policy iteration may be refined by performing flowpipe construction using higher-order Taylor series approximations. The result of the policy iteration may be used to truncate the Taylor series by providing better bound for the remainder term. Thus, flowpipe segments may be computed using template polyhedra that lead to a precise treatment of the continuous dynamics. The flowpipe may be employed to verify reachability properties of affine hybrid automata in addition to other applications, discussed above.

In one implementation of the present principles, a method for automatically determining the reachable states of a hybrid system utilizing template polyhedra, constructed in part using linear template expressions, includes: generating a set of template polyhedra expressions from a system description; employing policy iteration to produce an over-approximation of states reachable by the hybrid system from the expressions in the form of a relaxed invariant; and constructing a flowpipe of template polyhedra based on the relaxed invariant obtained from policy iteration to refine the over-approximation of reachable states and thereby determine the reachable states of the hybrid system.

In another implementation of the present principles, a system for automatically determining the reachable states of a hybrid system utilizing template polyhedra, constructed in part using linear template expressions, includes an expression generation module configured to generate a set of template polyhedra expressions from a system description; a policy iteration unit configured to employ policy iteration to produce an over-approximation of states reachable by the hybrid system from the expressions in the form of a relaxed invariant; and a flowpipe module configured to construct a flowpipe of template polyhedra based on the relaxed invariant obtained from policy iteration to refine the over-approximation of reachable states and thereby determine the reachable states of the hybrid system.

These and other features and advantages will become apparent from the following detailed description of illustrative implementations thereof, which is to be read in connection with the accompanying drawings.

BRIEF DESCRIPTION OF DRAWINGS

The disclosure will provide details in the following description of implementations of the present principles with reference to the following figures wherein.

DETAILED DESCRIPTION

Figure 1:
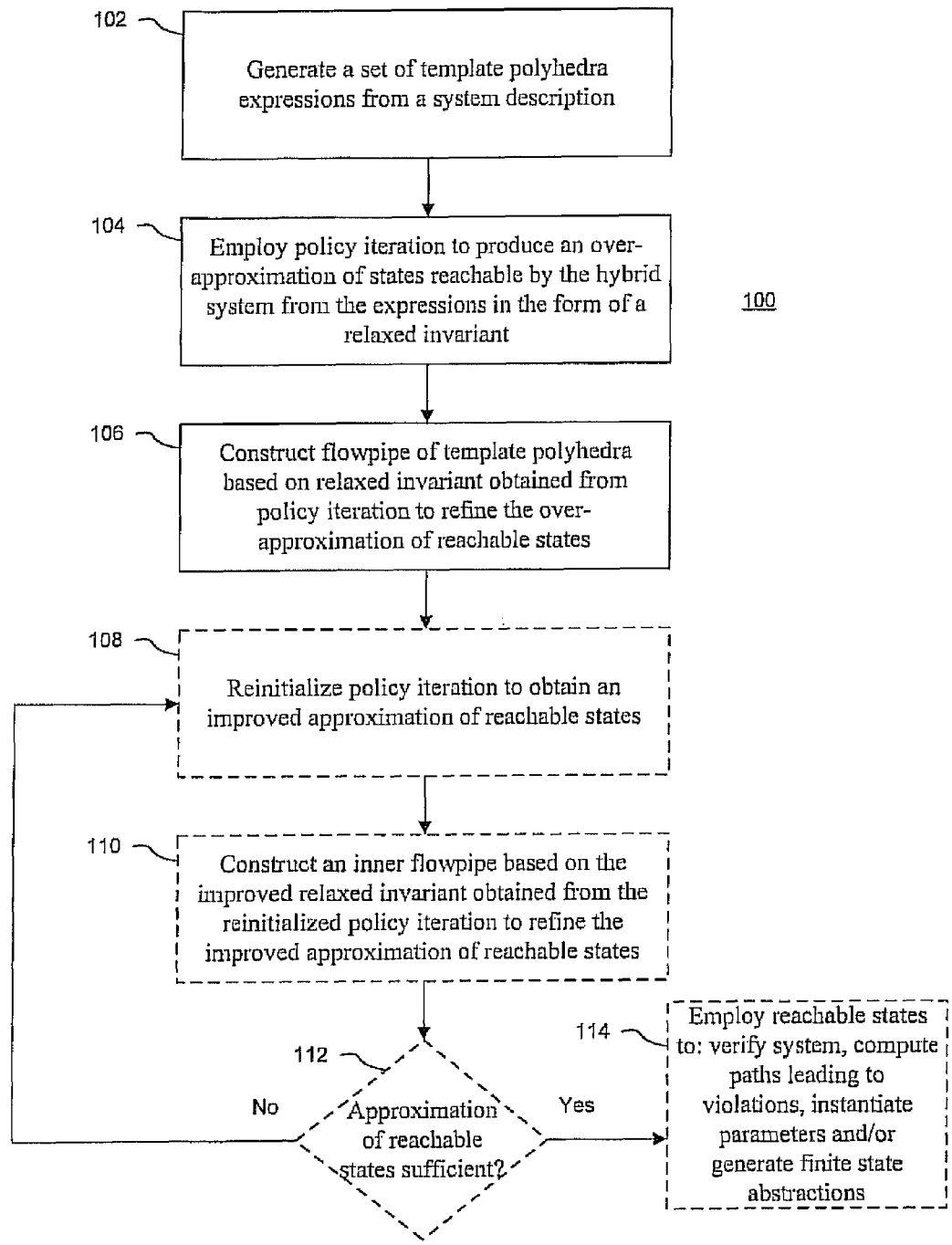
FIG. 1 is a high level flow diagram of a method for determining the reachable states of a hybrid system by constructing a flowpipe of template polyhedra using a relaxed invariant obtained from policy iteration in accordance with aspects of the present principles.

As mentioned above, aspects of the present principles may be applied to determine the reachable states of a hybrid system. A hybrid system is a computational model of a physical system that exhibits both discrete and continuous characteristics. For example, the hybrid system may be a discrete system that represents a digital device or a computer that interacts with or controls a continuous analog environment. Further, such a system may be represented by a finite state automaton description of the discrete system that switches between different "control modes." The environment/continuous part may be represented by a differential equation. Hybrid systems have applications in consumer electronics, telecommunications, medical equipment, automotive systems, and many other fields of technology.

A simple example of a hybrid system includes a digital room heater controlling the temperature in a room by means of a thermostat. When the temperature reaches an upper threshold, the controller switches the heater off in a discrete, almost instantaneous, operation that turns off the heater. Thus, there are two discrete modes, ON and OFF for the digital system. Each mode has a different dynamic for the room temperature. In the ON mode, the temperature rises due to the effect of the heater on the room temperature. In the OFF mode, the temperature cools due to the effect of the heater being off.

As mentioned above, in accordance with one implementation of the present principles, the reachable states of a hybrid system may be determined and employed for verification purposes. The state-space of a hybrid system is composed of the continuous variables that it manipulates. In the thermostat example described above, the state space may consist of the room temperature. Reachable states are states that a system may reach in accordance with some initial conditions and a system description. After determining the reachable states of a system, the reachable states may be compared to safety specifications to verify that the specifications are met.

According to aspects of the present principles, a succinct description of the set of reachable states of a hybrid system in terms of a template polyhedron may be computed. The set of reachable states may be referred to as a reach set. It should be noted that an exact determination of the reach set of a general hybrid system through computational or algorithmic means is known to be impossible. Therefore, use of computational techniques results in an approximation of the underlying reach set. If the approximation is guaranteed to always subsume the actual set of reachable states, it is termed an over-approximation of the reach set. Any reference herein to a determined set of reachable states or determined reachable states should be understood to mean an approximation of the reach-set. Similarly, any reference herein to determining/determine a set of reachable states or determining/determine reachable states should be understood to mean approximating/approximating the reach-set. It should also be understood that the meaning of the term "approximation" or "approximating" includes "an over-approximation" or "over-approximating," respectively.

In relation to system verification, the over-approximation of the reachable states may be utilized to prove that the system never reaches any state within an unsafe set of states U. This can be done by computing the reach set over-approximation R and determining if R intersects U. If R does not intersect U, then it can be guaranteed that the system does not reach the unsafe set.

Other implementations of the present principles include employing a determined over-approximation of the reachable states to compute likely paths leading to property violations of the system. For example, while system verification may indicate whether the system may reach an unsafe state, computing likely paths leading to property violations indicates why the system cannot be verified by providing a description of system behavior that results in the failure. In this way, problems associated with a system may be determined and addressed accordingly by utilizing the set of reachable states to compute paths leading to property violations.

Another implementation of the present principles may include employing a determined set of reachable states to instantiate parameters in a system description to guarantee safe operation. A parameter here is a constant in the system description that is left unspecified in practice. It may take on a range of values. In the thermostat example, the maximum room temperature where the heater is switched off and the minimum room temperature are examples of parameters. They are assumed to be constant and known in any given system instance. However, in a general system description they are represented by variables, such as T_min and T_max that are left uninstantiated. Parameters may also be specified with a domain of interest. The reach set approximation R, described above, may be described in terms of parameters. Further, the reachable set may be employed to instantiate parameters by indicating for which parameter values the system is safe. Thus, given an unsafe set U, described above, it is possible to obtain instantiations or sets of instantiations of the parameters so that the system remains safe by considering points in the set U that intersect R.

According to another implementation of the present principles, the hybrid system may be an infinite state hybrid system and the determined reachable states may be employed to generate finite state abstractions or models of an infinite state hybrid system. For example, with respect to the thermostat case, which may be an example of an infinite state hybrid system, described above, an abstraction or model may include a finite description of the temperature differences experienced by the system over time. The abstraction may be derived from the reachable states.

Referring now to more specific methods and systems in accordance with aspects of the present principles, template polyhedra may be employed to determine the reachable states of a hybrid system. A given set of template expressions $e_1, \ldots, e_m$ forms a family of template polyhedra, which are represented as $\wedge_i e_i \leq c_i$. The template expressions are provided as an input to the reachability problem and may be either user-generated or automatically generated by employing heuristic techniques. The family of polyhedra defined by the given template expressions may be used as a representation for sets of states.

The advantages of restricting the representation to a family of template polyhedra is that operations such as join, meet, discrete post condition and time elapse can be performed efficiently, in polynomial time, without requiring expensive facet enumeration. Although the technique depends on the input template expressions, the expressions may be determined by using simple heuristics for choosing template expressions, as stated above, which are quite effective in practice.

Given a set of template expressions, reachable states may be determined efficiently using template polyhedra instead of full polyhedra. In order to achieve this, techniques that over-approximate the time trajectories starting from an initial polyhedron according to the continuous dynamics at some location are used.

In accordance with one or more aspects of the present principles, a policy iteration approach may be employed to construct an over-approximation of the time trajectories for a given location starting from a given initial region. The approach may compute a single template polyhedron that is guaranteed to contain all the time trajectories. The concept of a relaxed invariant that includes all the time trajectories is used. We first define a notion of a certificate for such an invariant, demonstrating a duality between certificates and the set of invariants that are certified by them. This duality enables the determination of relaxed invariants using a policy iteration algorithm. Policy iteration may begin from an initial coarse over-approximation that is sound and successively refines it until no more refinement is possible. This process is shown to converge and results in an invariant that is a valid over-approximation of the time successors.

As discussed above, policy iteration has been applied in the prior art to compute the least fixed point for the interval, octagon and the template polyhedra domain. A key difference between prior art approaches and an approach in accordance with aspects of the present principles is that policy iteration is used as a means of computing an over-approximation to the time trajectories of a differential equation. This necessitates a different definition of a policy and a different form of iteration, which is provided in detail below. Furthermore, in contrast to using polyhedra as a fixed point of a refinement operator over cones of functions, also discussed above, a fixed point computed in accordance with aspects of the present principles is computed over the domain of template polyhedra. Moreover, the fixed point is computed using a policy iteration approach that does not require widening/narrowing heuristics employed to force convergence.

Additionally, the policy iteration approach in accordance with aspects of the present principles provides an initial approximation to the time trajectories. This approximation is refined by means of a flowpipe construction. In flowpipe construction, a series of polyhedra whose disjunctions approximate the time evolution for some time interval is computed. A sound method for flowpipe construction is provided herein based on solving numerous linear programs in order to obtain bounds on the terms involved in a series expansion. The expansion is truncated using a remainder term, which is itself approximated by the over-approximation computed using the policy iteration.

Referring now in detail to the figures in which like numerals represent the same or similar elements and initially to FIG. 1, a flow diagram of an exemplary method 100 for automatically determining the reachable states of a hybrid system utilizing template polyhedra in accordance with aspects of the present principles is illustrated. The method may begin at step 102 in which a set of template polyhedra expressions are generated from a system description, as discussed above.

At step 104, policy iteration may be employed to produce an over-approximation of states reachable by the hybrid system from the expressions in the form of a relaxed invariant, as described more fully below.

At step 106, a flowpipe of template polyhedra based on the relaxed invariant obtained from policy iteration may be constructed to refine the over-approximation of reachable states and thereby determine the reachable states of the hybrid system, as discussed more fully below.

Further, method 100 may optionally include steps 108, 110, 112 and 114. At step 108, policy iteration may be reinitialized to obtain an improved approximation of reachable states by using a bound of the flowpipe and determining an improved relaxed invariant.

In addition, at step 110, an inner flowpipe based on the improved relaxed invariant obtained from the reinitialized policy iteration may be constructed to refine the improved approximation of reachable states.

At decision step 112, it is determined whether the approximation is sufficient. If the approximation of reachable states is insufficient, then steps 108 and 110 are repeated. If the approximation is sufficient, then the process may end or the process may proceed to step 114.

At step 114, after determining a sufficient approximation of reachable states, the determined reachable states may be employed to verify whether the hybrid system meets safety specifications by comparing reachable states in the flowpipe to the safety specifications, as discussed above. Further, at step 114, the determined reachable states may be employed to compute likely paths leading to property violations, instantiate parameters in a system description and/or generate finite state models, as stated above. Steps of method 100 are discussed in more detail below.

Figure 2:
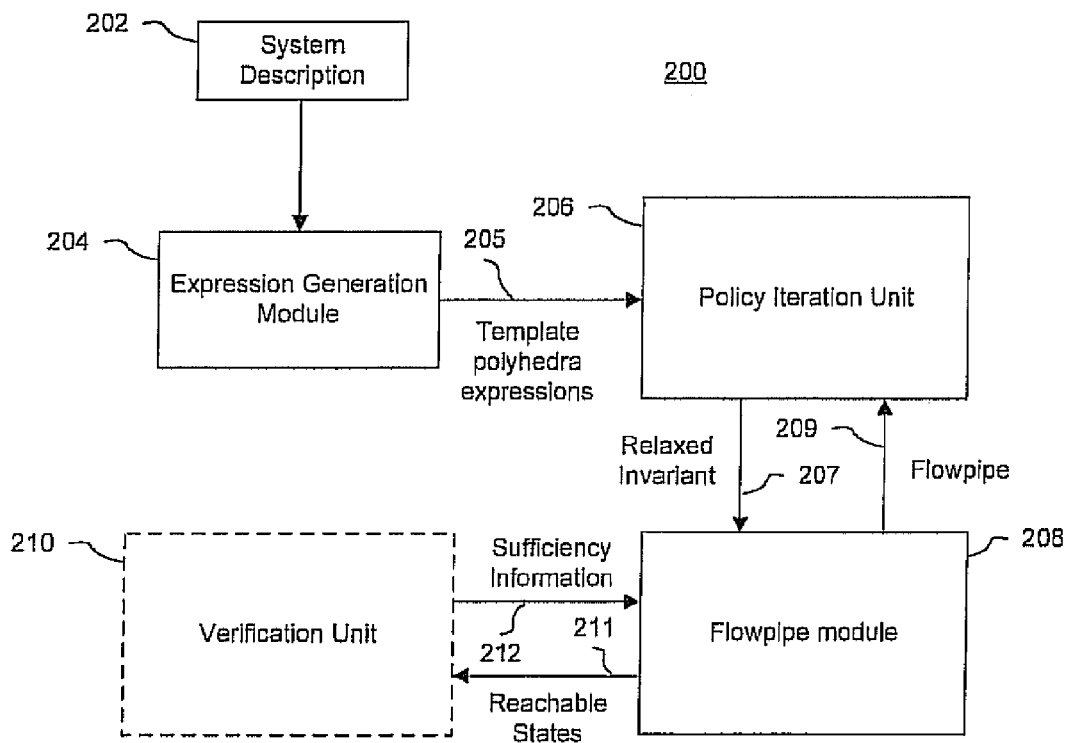
FIG. 2 is a high-level block/flow diagram of a system for determining the reachable states of a hybrid system in accordance with aspects of the present principles.

With reference to FIG. 2, a block/flow diagram of an exemplary system 200 for automatically determining the reachable states of a hybrid system utilizing template polyhedra in accordance with aspects of the present principles is illustrated. System 200 may include a system description 202 for a hybrid system, an expression generation module 204, a policy iteration unit 206, a flowpipe module 208, and, optionally, a verification unit 210. The expression generation module 204 may be configured to perform step 102. For example, the expression generation module 204 may be configured to generate a set of template polyhedra expressions 205 from the system description 202, as discussed with respect to step 102.

The policy iteration unit 206 may be configured to perform steps 104 and/or 108. For example, the policy iteration unit 206 may be configured to employ policy iteration to produce an over-approximation of states reachable by the hybrid system from the expressions in the form of a relaxed invariant 207, as discussed with respect to step 104. In addition, the policy iteration unit 206 may, for example, be further configured to reinitialize policy iteration to obtain an improved approximation of reachable states by using a bound of a flowpipe 209 and determining an improved relaxed invariant 207, as discussed with respect to step 108.

The flowpipe module 208 may be configured to perform steps 106 and/or 110. For example, the flowpipe module 208 may be configured to construct a flowpipe 209 of template polyhedra based on the relaxed invariant obtained from the policy iteration unit 206 to refine the over-approximation of reachable states 211 and thereby determine the reachable states 211 of the hybrid system, as discussed with respect to step 106. Moreover, the flowpipe module 208 may, for example, be further configured to construct an inner flowpipe 209 based on the improved relaxed invariant 207 obtained from the reinitialized policy iteration to refine the improved approximation of reachable states 211, as discussed with respect to step 110. The flowpipe module 208 may additionally be configured to perform step 112. For example, flowpipe module 208 may be configured to determine whether the approximation of reachable states is sufficient, as discussed with respect to step 112. However, it should be understood that other components of system 200 or a controller (not shown) may be configured to determine whether the approximation of reachable states is sufficient.

The verification unit 210 may be configured to perform step 114. For example, verification unit 210 may be configured to verify whether the hybrid system meets safety specifications by comparing reachable states of a flowpipe, constructed by the flowpipe module 208, to safety specifications, as discussed above. Additionally or alternatively, the verification unit 210 may be configured to employ reachable states determined by the flowpipe module 208 to compute likely paths leading to property violations, instantiate parameters in the system description, and/or generate finite state models, as stated above. Further, as discussed more fully below, the verification unit 210 may provide sufficiency information 212 to the flowpipe module 208, permitting the flowpipe module 208 to determine whether an approximation of reachable states is sufficient.

System 200 may be implemented on software stored on a program storage device and run by a computer processor. Similarly, a computer readable medium may tangibly embody a program of instructions executable by a computer to perform the method steps of method 100.

It should be understood that implementations of the present principles described herein may be entirely hardware, entirely software or including both hardware and software elements. In a preferred implementation, the present invention is implemented in software, which includes but is not limited to firmware, resident software, microcode, etc.

Implementations may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device). The medium may include a computer-readable medium such as a semiconductor or solid state memory, magnetic tape, a removable computer diskette, a random access memory (RAM), a read-only memory (ROM), a rigid magnetic disk and an optical disk, etc.

Prior to describing method 100 in more detail, some preliminary definitions are described below to aid in understanding aspects of the present principles.

Preliminaries

Let R denote the set of reals, and $R_+ = R \cup \pm\infty$ the set of extended real numbers. A first order assertion $\phi$, with free variables $x_1, \ldots, x_n$ over the theory of reals, represents $[\![\phi]\!] \subseteq R^n$. A column vector is written $\langle x_2, \ldots, x_n \rangle$ and represented succinctly as x. Capital letters A, B, C and X, Y, Z are used to denote matrices. The $i^{th}$ row of a matrix A is denoted by the row vector $A_i$.

Vector Fields & Lie Derivative.

A vector field D over $R^n$ associates each point $x \in R^n$ with a vector $D(x) \in R^n$. Given a system of differential equations of the form $\dot{x}_1 = f_1(x_1, \ldots, x_n)$, we associate a vector field $D(x) = \langle f_1(x), \ldots, f_n(x) \rangle$. We assume that each $f_i$ is Lipschitz continuous, thus guaranteeing a unique local solution. A vector field is affine if all the function $f_1, \ldots, f_n$ are all affine functions over x.

Let $D(x)=(p_1(x), \ldots, p_n(x))$ be a vector field over $R^n$. The Lie derivative of a continuous and differentiable function $f: R^n \mapsto R$ over V is $$L_D(f) = (\nabla f) \cdot D(x) = \sum_{i=1}^{n} \frac{\partial f}{\partial x_i} \cdot p_i(x).$$

Linear Programming.

We briefly discuss the important facts about linear programming that will be used below. A linear program(LP) is an optimization problem with a linear objective over a convex polyhedron:

P: max. $c^T x$ subject to $Ax \leq b$.

In general, if $[\![ Ax \leq b ]\!]$ is non empty and bounded then the optimal solution always exists. Corresponding to each LP, there exists a dual formulation:

D: min. $b^T \lambda$ s.t. $A^T \lambda = c \wedge \lambda \geq 0$.

If the original LP P has an optimal solution then the problem D has the same optimal value. The dual solution $\lambda$ forms a certificate to the optimum. Formally, the dual solution $\lambda$ certifies a primal solution x if (a) x is primal feasible, (b) $\lambda$ is dual feasible and (c) $c^T x = b^T \lambda$.

Linear programs may be solved using techniques such as Simplex and interior point techniques. The former technique is polynomial time for most instances whereas the latter class of techniques can solve LPs in polynomial time.

Hybrid Systems.

To model hybrid systems we may use hybrid automata.

Definition 1 (Hybrid System). A hybrid system $\Psi:\langle n,L,T,\Theta,D,I,l_0\rangle$ is composed of the following components:

n is the number of continuous variables. These variables are denoted by the set $V=\{x_1, \ldots, x_n\}$.

L, a finite set of locations;

T, a set of (discrete) transitions. Each transition $\tau:\langle l_1, l_2, \rho_\tau \rangle \in T$ consists of a prelocation $l_1 \in L$, a postlocation $l_2 \in L$, and an assertion $\rho_\tau$ over $V \cup V'$, representing the next-state relation, where V' denotes the values of V in the next state;

$\Theta$, an assertion specifying the initial condition;

D a map that maps each location $l \in L$ to a vector field D(l), specifying the evolution of continuous variables in that location;

I, a map that maps each location $l \in L$ to a location condition (location invariant), I(l), an assertion over V;

$l_0 \in L$, the initial location.

Definition 2 (Computation).

A computation of a hybrid automaton is an infinite sequence of states $\langle l,x \rangle \in L \times R^n$ of the form $\langle l_0, x_0 \rangle, \langle l_1, x_1 \rangle, \langle l_2, x_2 \rangle,$ such that the initiation condition $l_0 = l_0$ and $x_0 \models \Theta$ holds, and for each consecutive state pair $\langle l_i, x_i \rangle, \langle l_{i+1}, x_{i+1} \rangle$ one of the two consecution conditions below is satisfied.

Discrete Consecution:
there exists a transition $\tau: \langle l_1, l_2, \rho\tau \rangle \in T$ such that $l_i = l_1$, $l_{i+1} = l_2$, and $\langle x_i, x_{i+1} \rangle \models \rho_\tau$, or Continuous Consecution:
$l_i = l_{i+1} = l$, and there exists a time interval $\delta \geq 0$, and a time trajectory $f:[0,\delta] \mapsto R^n$, such that f evolves from $x_i$ to $x_{i+1}$ according to the vector field at location l, while satisfying the location condition I(l). Formally, 1. $f(0) = x_1$, $f(\delta) = x_2$, and $(\forall t \in [0, \delta])$, $f(t) \models I(l)$, 2. $(\forall t \in [0, \delta])$, $\frac{df}{dt} = D(l)|_{x=f(t)}$.

Definition 3 (Affine Hybrid Automaton).

A hybrid automaton $\Psi$ is affine if the initial condition, location invariants and transition relations are all represented by convex polyhedra; and furthermore, the dynamics at each location D(l) is an affine vector field.

It should be noted that although the description of aspects of the present principles provided below focuses solely on affine polyhedra, aspects of the present principles may be extended to the non-affine case by those of ordinary skill in the art.

Given an assertion $\phi$ over the continuous variables, its post-condition, across a transition $\tau:\langle l,m,\rho \rangle$ denotes the states reachable from states $s \in [\![ \phi ]\!]$ as a result of the discrete transition $\tau$. Mathematically, $post(\phi,\tau)[y]: (\exists x)(\phi(x) \wedge \rho(x,y))$. The post condition may be computed using intersection followed by an existential quantification.

Similarly, given $\phi$, the set of possible time trajectories inside a location l with invariant I(l) and dynamics D(l) is represented by its time elapse $\Psi:timeElapse(\phi,\langle D,I \rangle)$. The time elapse operator is difficult to describe mathematically. Its over-approximation by means of policy iteration and flow-pipe construction form two of the main aspects and contributions of the present principles.

The post condition and time elapse operations are the two fundamental primitives for over-approximating the reachable sets of a given hybrid automaton. The former operation transfers assertions representing sets of states across discrete transitions, whereas the latter models the continuous time evolution of sets of states.

With reference to Table 1, Algorithm 1 presents the use of the post conditions and time elapse operators for the analysis of hybrid systems. Algorithm 1 may be employed to compute an over-approximate reach set for a hybrid system. The structure of Algorithm 1 follows a basic format similar to algorithms employed for safety verification in many tools.

TABLE 1

Algorithm 1

List wlist : worklist consisting of unprocessed locations and assertions.
map reachMap : maps each location to its current reachability predicate
function analyze-hybrid-system {compute reachable state (predicates)}
{initialize the worklist and reachmap}
wlist : = {$\langle l_0, \Theta \rangle$} {add initial location and start predicate to the worklist}
($\forall l \in L$) reachMap (l) : = false
{initial reachable region is empty for each mode}
while wlist ≠ 0 do
    $\langle m, \phi \rangle$ = pop(wlist) {pop an unprocessed mode/predicate from worklist}
    if $[\![ \phi ]\!] \not\subseteq [\![ reachMap(m) ]\!]$ then
        {if the states in the popped predicate have not already been visited}
        visit(m, $\phi$) {process unvisited states}
    end if
end while
{No more unprocessed predicates. Hence, all states have been visited.}
end function {analyze-hybrid-system}
function visit( m: mode, $\phi$ : predicate) {mode m is entered with state set $\phi$ }
$\phi'$ : = computeTimeElapse( $\phi$, inv(m), dynamics (m))
{apply time elapse operator to $\phi$ }
reachmap(m) : = reachmap(m) $\vee \phi'$
{add $\phi'$ to reachmap. If $\phi'$ is polyhedral, $\vee$ may be approximated by convex TABLE 1-continued Algorithm 1 hull}
  for all τ : m → m' outgoing discrete transitions of mode m do
    ψ' := post(φ',τ) {compute post condition}
    wlist := wlist ∪ ⟨m',ψ'⟩ {enqueue new ⟨location, predicate⟩ pair}
  end for
end function {visit}

Theorem 1.

Let $U \subset R^m$ be an unsafe region. If, Algorithm 1 terminates and $(\forall l \in \overline{L})$, ⟦ reachMap(l) ⟧ ∩U=∅ then U is not reachable.

For the case of affine hybrid systems, it is common practice to implement an algorithm such as Algorithm 1 using polyhedra to represent sets of states. However, the primitive operations such as post-condition, time-elapse and convex hull on general polyhedra require exponential time to perform. We now show that the algorithm can be efficiently implemented using template polyhedra.

Template Polyhedra

In this section, template polyhedra along with algorithms for checking inclusion, intersection, union and post condition are presented.

A template is a set $H=\{h_1(x), \ldots, h_m(x)\}$ of linear functions over x. We represent a template m×n matrix H wherein each row $H_i$ corresponds to the linear expression $h_i$.

Definition 4 (Template Polyhedron).

A template polyhedron over a template H is a polyhedron of the form $Hx \leq c$, wherein $c \in R_+^m$. Such a polyhedron will be represented as ⟨H,c⟩.

By convention, the constraint $h_i \leq \infty$ is synonymous with true and similarly $h_i \geq \infty$ is synonymous with false.

Consider a region $C \subset R^n$ and template H. There exists a smallest template polyhedron ⟨H,c⟩ that over-approximates C, denoted $c = \alpha_H(C)$. Each component $c_i$ of c may be computed using the optimization problem $c_i$: max. $h_i(x)$ s.t. $x \in C$. Note that if C is a polyhedron then its best over-approximation according to a template H can be found by solving |H| linear programs.

Lemma 1.

For any closed set $C \subset R^n$, the polyhedron $Hx \leq \alpha_H(c)$ is the smallest template polyhedron that includes C.

EXAMPLE 1

Let $H=\{x,-x,y,-y\}$ be a template. Consider the set $C:(x^2+y^2 \leq 1)$ of all points inside the unit circle. The smallest template polyhedron containing C has the instance vector ⟨1,1,1,1⟩.

Lemma 2.

If $c_1 \leq c_2$ then $⟨H,c_1⟩ \subseteq ⟨H,c_2⟩$. However, the converse need not hold.

EXAMPLE 2

Consider the representation of the set $C:x=0 \wedge =0$ using the template $H=\{x,-x,y,-y,x+y\}$. The vector $c=⟨0,0,0,0,0⟩$ is one such representation. However, the vectors $c_1=⟨0,0,0,0,100⟩$, $c_2=⟨-10,0,0,0,0⟩$, and $c_3=⟨0,-100,0,0,0⟩$ also represent the same set. In each case $⟨H,c_i⟩ \subseteq ⟨H,c⟩$. However $c_i \not\leq c$. Intuitively, we note that "fixing" any four of the rows to 0, makes the remaining constraint row redundant.

It is algorithmically desirable to have a unique representation of each set by a template polyhedron. Given a template polyhedron ⟨H,c⟩, its canonical form is given by $can_H(c) = \alpha_H(Hx \leq c)$. An instance vector is canonical iff $c = can_H(c)$.

Lemma 3.

The following are true for canonical instances:
(a) $⟨H,c⟩ \equiv ⟨H,d⟩$ iff $can_H(c) = can_H(d)$.
(b) $⟨H,c⟩ \subset ⟨H,d⟩$ iff $can_H(c) < can_H(d)$.

Thus, canonicity provides a unique representation of template polyhedra. Any representation can be converted into a canonical representation in polynomial time by using optimization problems. Therefore, without loss of generalization, we assume that any representation ⟨H,c⟩ is canonical.

The template polyhedral hull of $⟨H,c_1⟩$ and $⟨H,c_2⟩$ (written $c_1 \sqcup c_2$) is defined as $c=max(c_1,c_2)$, where max denotes the entry-wise minimum. In effect, ⟨H,c⟩ is the smallest template polyhedron containing both $⟨H,c_1⟩$ and $⟨H,c_2⟩$. Furthermore, if $c_1$ and $c_2$ are canonical then so is c.

Similarly, intersection of two polyhedra $c_1$, $c_2$ is represented by $c=min(c_1,c_2)$. Unlike the hull, however, the intersection of two canonical instances may fail to be canonical. Therefore, the result has to be canonicized by using optimization.

Given a template polyhedron $P_0$: ⟨J,c⟩, and a discrete transition relation τ, we wish to compute the smallest template polyhedron $P_1$: ⟨H,d⟩, that over approximates the post-condition $post(P_0,\tau)$. Note that the templates J and H need not be identical. The post condition $d:post_H(⟨J,c⟩\tau)$ is computed by posing an optimization query for each $d_i$:max.$h_iy$ subj. to $Jx \leq c \wedge \rho_\tau(x,y)$. The resulting d is always guaranteed to be canonical.

Theorem 2.

The polyhedron $post_H(P_0,\tau)$ is the smallest template polyhedron containing $post_H(P_0,\tau)$.

Time Elapse

Thus far, efficient algorithms for operations such as intersection, union, equivalence, inclusion and post-condition across a discrete transition have been presented. In order to implement Algorithm 1 using template polyhedra, we apply an efficient technique to over-approximate the continuous time evolution.

Let $D=\{f_1, \ldots, f_n\}$ be an affine vector field. Therefore, for any affine function f: $c^Tx+d$ its Lie derivative $L_D(f)$ is also affine.

Let H be a template with m>0 rows, $P_0$: $⟨H,c_0⟩$ represent the initial condition and $P_1$: ⟨H,inv⟩ represent the location invariant in terms of template polyhedra. We assume that the initial condition is included in the location invariant, i.e, $c_0 \leq inv$. Our goal is to compute an instance vector c such that (a) $c_0 \leq c$, (b) $c \leq inv$, and finally, (c) every time trajectory τ starting from a state satisfying ⟦ $P_0$ ⟧ must satisfy ⟨H,c⟩. Such an instance c can be used as an over-approximation to the continuous evolution. Such a c may be found by computing a relaxed invariant.

Definition 5 (Relaxed Invariant).

An instance ⟨H,c⟩ is a relaxed invariant w.r.t a scale factor $\mu \in R$, iff
(a) $c_0 \leq c$, and $c \leq inv$
(b) For each $i \in [1,m]$, if $c_i < inv_i$ then $⟨H,c⟩ \models L_D(H_ix) + \mu H_ix < \mu c_i$.

Theorem 3 (Soundness).

If ⟨H,c⟩ is a relaxed invariant for some scale factor μ, then the polyhedron ⟨H,c⟩ contains all the time trajectories starting from $⟨H,c_0⟩$ and evolving according to dynamics D inside the region ⟨H,inv⟩.

Policy Iteration

Returning now to FIG. 1, as stated above, a method 100 for automatically determining the reachable states of a hybrid system utilizing template polyhedra in accordance with aspects of the present principles may begin at step 102 by generating a set of linear template polyhedra expressions from a system description. As discussed above, the template expressions may be either user-generated or automatically generated by employing simple heuristic techniques. Further, the template expressions may be used as a representation for sets of states.

Template construction is an important aspect in the performance of method 100. A larger set of template expressions provides a richer representation of sets of states. At the same time, the size and the number of LP instances used in accordance with an implementation of the present principles may be linear in the number of templates. Therefore, the number of templates may impact performances.

A template construction strategy in accordance with one implementation of the present principles may use two basic sources of template expressions: (a) fixed templates such as boxes and octagons; and (b) expressions occurring in the hybrid system description. Fixed templates used may include box templates, which include the expressions $\pm x_i$ for each continuous variable $x_i$ in the system, and octagon templates of the form $\pm x_i, \pm x_j$ or all variable pairs $x_i \neq x_j$.

Additionally, starting from the basic template expressions, we may repeatedly enrich the set of templates by computing the Lie derivatives of the existing templates until a fixed limit on the number of templates has been passed. In general, the heuristics described above may naturally limit the number of templates to be linear in the system description and at most quadratic in the number of variables.

Returning to FIG. 1, at step 104, policy iteration may be employed to produce an over-approximation of states reachable by the hybrid system from the generated set of template polyhedra expressions in the form of a relaxed invariant, as described herein below.

In accordance with aspects of the present principles, policy iteration may be used to compute such an over-approximate template polyhedron $\langle H,c \rangle$. Policy iteration starts from an initial relaxed invariant $\alpha(0)=inv$. At each step, it iteratively improves the solution by computing a smaller relaxed invariant. This results in a sequence of iterates: $inv=\alpha(0) \geq \alpha(1) \geq \ldots \geq \alpha(N)=\alpha(N+1) \geq c_0$ that will eventually converge to a solution $\alpha(N)$, allowing no further improvement. Each solution $\alpha(i)$ forms a valid relaxed invariant.

For the sake of simplicity, it is assumed that the initial conditions and the invariants are non-empty and bounded. The approach can be extended to treat the corner cases easily.

Dual Certificate.

Let $\langle H,\alpha \rangle$ be a relaxed invariant w.r.t a scale factor $\mu$. A certificate that can be used to verify this fact is defined. From Definition 5, the key requirement to be checked is that for each row $j \in [1,m]$, either $\alpha_j = inv_j$ or that $\langle H, \alpha \rangle \models \mu(H_j x - \alpha_j) + L(H_j x) < 0$. This is in turn verified by checking that the optimal solution of the following LP $L_j$ is negative:

$$L_j: \max \mu(H_j x - \alpha_j) + L(H_j x) \text{ s.t. } \langle H, \alpha \rangle \quad (1)$$

Note that since $\langle H,\alpha \rangle$ is feasible and bounded (because $c_0 \leq \alpha \leq inv$), the optimal solution to $L_j$ exists and is bounded. Therefore, the dual LP $D_j$ can be used to certify this optimum:

$$\min \alpha^T \lambda - \mu \alpha_j \text{ s.t. } H^T \lambda = (\mu(H_j) + L(H_j))^T \wedge \lambda \geq 0 \quad (2)$$

In summary, given a relaxed invariant $\langle H, \alpha \rangle$, the certificate for each row $j$ s.t. $\alpha_j \neq inv_j$, is a vector $\lambda \geq 0$, that is an optimal solution to the dual problem $D_j$ such that $\alpha^T \lambda - \mu \alpha_j < 0$ (objective of the dual LP in Eqn. 2). Note that by LP duality, the existence of an optimal solution to $L_j$ implies the same for the dual $D_j$.

Definition 6 (Invariant Certificate).

An invariant certificate is defined as a tuple $\langle F, \Lambda \rangle$ wherein $F \subseteq \{1, \ldots, m\}$ is a set of frozen row indices, while $\Lambda$ is a m×m matrix with non negative entries; s.t. for each index $j \in [1,m]-F$, $H^T \Lambda_j = (\mu(H_j) + L(H_j))^T \wedge \Lambda_j \geq 0$ (see dual formulation, Eqn. 2). For each row index $j \in F$, the row vector $\Lambda_j = 0$ by convention.

An invariant $\langle H, \alpha \rangle$ is certified by $\langle F, \Lambda \rangle$ iff for each $j \in F$, $\alpha_j = inv_j$ and for each $j \in [1,m]-F$, $\alpha^T \Lambda_j - \mu \alpha_j < 0$.

For each certificate $\pi: \langle F, \Lambda \rangle$, the relaxed invariants that are certified by $\pi$ can be described using the following constraints:

$$L_\pi: c_0 \leq y \leq inv \wedge \bigwedge_{j \in F} y_j = inv_j \wedge \bigwedge_{j \in [1,m]-F} \Lambda_j^T y - \mu y_j < 0 \quad (3)$$

If the constraints $L_\pi$ corresponding to a certificate are feasible then there exists a least relaxed invariant that can be certified by $\pi$, which can be found by solving the following optimization problem: min. $\Sigma_j y_j$ s.t. $L_\pi$.

Lemma 4.

If constraint $L_\pi$ for a certificate $\pi$ is feasible, then it has a minimal solution. I.e., $\exists c \in [\![ L_\pi ]\!]$, s.t. $\forall d \in [\![ L_\pi ]\!]$ $c \leq d$.

Note that each relaxed invariant may be certified by more than one feasible certificate. On the other hand, for each certificate there exists a least relaxed invariant that can be obtained by optimizing $L_\pi$. A certificate $\pi$ is termed feasible iff the constraint $L_\pi$ is satisfiable. The following surprising result forms the basis of the policy iteration technique:

Theorem 4.

For a given instance $\langle H, c_0, inv, D \rangle$, the number of certificates is finite.

Proof.

Following Definition 6, we note that each dual certificate $\pi: \langle F, \Lambda \rangle$ where F has $2^m$ possible values. Similarly, for each row $j \notin F, \Lambda_j$ is a solution to the dual LP $D_j$, and hence is a vertex of the polyhedron $H^T \Lambda_j = (\mu(H_j) + L(H_j))^T \wedge \Lambda_j \geq 0$. Since the polyhedron has finitely many vertices, the number of dual certificates is finite.

Let $P=\{\pi_1, \ldots, \pi_M\}$ be the set of all the feasible certificates. For each certificate let $C=\{c_1, \ldots, c_M\}$ be the corresponding tightest relaxed invariants obtained by solving the LP $L_\pi$.

Lemma 5.

For every relaxed invariant c, there exists a tighter relaxed invariant $c_j \in C$, s.t. $c_j \leq c$.

Proof.

Let $\pi_j$ be the feasible certificate for c. It follows that the corresponding tightest invariant $c_j \leq c$.

Lemma 6 (Least Selection Lemma).

If c, $d \in C$, then e: min(c,d), is a relaxed invariant. Therefore, the set C has an infimum.

Proof.

Let $\pi_1: \langle F_c, \Lambda_c \rangle$ and $\pi_2: \langle F_d, \Lambda_d \rangle$ be the corresponding certificates. We will construct a certificate $\pi: \langle F, \Lambda \rangle$ that certifies e. The index set $F=F_c \cap F_d$. Similarly, for each index $k \notin F$, we choose the corresponding row in $\Lambda_c$ or $\Lambda_d$ depending on whether $c_j$ or $d_j$ has the larger value. One may verify that $\Lambda$ is a valid certificate that certifies e.

Since e is a relaxed invariant, by Lemma 5, it follows that there exists an invariant $c_k \in C$ st. $e \leq c_k$. By repeated application, we see that there exists a $c_i \in C$ such that $c_i = \max(c_1, \ldots, c_M)$.

A simple algorithm for computing the least relaxed invariant enumerates all the possible certificates by exploring the vertices of the corresponding dual polyhedra. The smallest polyhedron to each of these certificates can then be computed to obtain the set C. Finally, the supremum of the set is the required invariant.

Theorem 5.

The least relaxed invariant for a given template exists and can be computed algorithmically.

Unfortunately, the simple procedure is doubly exponential in the size of the template.

Lemma 7.

The number of certificates is $O(2^m \cdot m^{2m})$.

A policy iteration algorithm may be employed to converge to a relaxed invariant while exploring a tiny fraction of the set of certificates in practice. In general, this solution is not guaranteed to be the least solution.

Let $c_0 \leq \alpha \leq$ inv be a relaxed invariant. The theory developed thus far may be used to obtain a certificate that can improve a given relaxed invariant. Such a certificate $\pi$ may be obtained by solving the dual LP $D_j$ of Eqn. 2 for each row j. Once a dual certificate is obtained, the least relaxed invariant that can be certified by $\pi$ is determined by solving the LP $L_\pi$ for Eqn. 3.

TABLE 2

Algorithm 2

⟨H,c₀,inv,D⟩: Problem Instance.
function policy-iteration
  α(0) := inv {Choose an initial relaxed invariant α(0)}
  while α(i +1) > α(i) do
    π (i) := ImproveCertificate(α(i))
    α(i +1) := MaxSolution(π (i)) {Improve solution – Note that
    α(i +1) > α(i)).}
  end while
end function {policy-iteration}

A policy iteration algorithm in accordance with an aspect of the present principles is shown in Table 2. It begins with an initial invariant α(0)=inv and proceeds to improve upon this solution iteratively. It maintains that α(i) is a relaxed invariant. At each iteration, it first extracts a certificate π(i) for α(i) by solving the dual LP Dj for each row j that is not frozen in π(i). The LP tries to obtain a dual certificate that can provide the best improvement on the current certificate. The improved solution α(i+1) is obtained as the smallest instance that can be explained by π(i). The process converges when α(i+1)=α(i).

Theorem 6.

The policy iteration algorithm in Table 2 eventually converges to a relaxed invariant.

Flowpipe Construction

Referring again to FIG. 1 illustrating a method 100 for automatically determining the reachable states of a hybrid system utilizing template polyhedra in accordance with aspects of the present principles, subsequent to obtaining a relaxed invariant from policy iteration, at step 106, as described herein below, a flowpipe of template polyhedra based on the relaxed invariant may be constructed to refine an over-approximation of reachable states and thereby determine the reachable states of the system.

Thus far, a technique to compute a single template polyhedron that over-approximates the time elapse has been presented. A refinement of the over-approximation is advantageous because, for many systems, the dynamics are such that the resulting time trajectories form a non-convex set. As such, the best template polyhedron may not be a tight over-approximation. To address the problem, the time trajectories may be over-approximated by means of the union of many template polyhedra into a flow pipe using set integration.

Let ⟨H,c₀inv,D⟩ be an instance of the time elapse problem. Let ⟨H,c⟩ be the relaxed invariant found by applying the policy iteration method presented in the previous sections. Let $\Im_s(t)$ denote the set of states reachable by time evolution starting from ⟨H,c₀⟩, at time $t \geq 0$. Similarly, $\Im_s([t,t+h))$ denotes the set of reachable states in the time interval [t,t+h) for a time step h>0. Thus the set integration and flowpipe construction problems may be defined as follows:

Set Integration:
Approximate $\Im(t)$ at t=0,h,2h, . . .
Flowpipe Approximation:
Approximate $\Im([t,t+h))$ at t=0,h, . . .
More specifically, a series of flowpipe segments ⟨H,c₁⟩,⟨H,c₂⟩, . . . , ⟨H,c_N⟩, are constructed such that each segment $c_i \leq c$. Given an inputs step size $\delta$, we construct polyhedra that over approximate $\Im([0,\delta)), \Im([\delta,2\delta))$ and so on until the time trajectories exit the invariant region ⟨H,c⟩, or are included in the previously seen flowpipe segments.

Linear functions of the form f: $c^T x$ are considered. By convention, the $j^{th}$ order Lie derivative of a function is denoted $c^T x$ as $c^{(j)} x$. Let $S_t$: ⟨H,c_t⟩ be an over-approximation for some time interval [t,t+δ], where $t \geq 0, \delta > 0$.

The Taylor series expansion may be used to advance an approximation $S_t$: ⟨H,c_j⟩ ⊃ $\Im[t,t+\delta]$ to obtain an approximation $S_{t+\delta}$: ⟨H,c_{j+1}⟩ ⊃ $[t+\delta,\overline{t+2\delta}]$. For each row $H_i$ in the template, we may perform a Taylor series expansion:

$$H_i x(t + \delta) = \quad (4)$$

$$H_i x(t) + \delta H_i^{(l)} x(t) + \ldots + \frac{\delta^m}{m!} H_i^{(m)}(x(t)) + \frac{\delta^{m+1}}{(m+1)!} H_i^{(m+1)} x(t+\theta)$$

where $0 \leq \theta < \delta$. Note that the first m terms are functions of x(t), whereas the last term, called a remainder term, is a function of x(t+θ). The exact value of θ is not known and is conservatively treated as a non-deterministic input. In other words, $H_i x(t+\delta)$ may be written as a sum of two expressions $H_i x(t+\delta) = g_i^T x(t) + r_i^T x(t+\theta)$, where in $g_i$ represents the sum of the first m terms of the Taylor series and $r_i$ represents the remainder term. Since $x(t) \in S_t$, an upper bound on $g_i(x(t))$ is obtained by solving the following LP:

$$g_i^{max} = \max. g_i^T x \text{ subj.to. } x \in S_t \quad (5)$$

Similarly, even though the remainder term cannot be evaluated with certainty, it may be inferred that $x(t+\theta) \in \langle H,c \rangle$, based on the policy iteration. A bound on $r_i x(t+\delta)$ is obtained by solving the optimization problem $$n^{max} = \max. r_i^T y \text{ subj.to. } y \in \langle H,c \rangle \quad (6)$$

The overall bound on $H_i x(t+\delta)$ is given by $g_i^{max} + n^{max}$. Finally, the instance ⟨H,c_{j+1}⟩ is obtained by computing $g_i^{max} + n^{max}$ corresponding to each template row i.

Note that in the optimization problem above, the time step δ is a user-input constant, each Lie-derivative $g_i^{(m)}$ is affine and $S_t$ is a template polyhedron. As a result, the optimization problems encountered for affine vector fields are linear programs. It should be noted that the time step may be varied along with the number of flow pipe segments in accordance with the application with which determined reachable states are employed

EXAMPLE 3

Consider the following linear system $\dot{x}=2x-y, \dot{y}=2y-x$. One step of the set integration for the initial region $\Theta$: $(0 \leq y \leq 1) \wedge (x=0)$ for $\delta=0.1$ is carried out. Let $H=\{x,-x,y,-y\}$ and let $-100 \leq x \leq 0$ and $0 \leq y \leq 100$ be the relaxed invariant. Consider the template H with $H_1(x,y)=x$. Note that $g_1^{(1)}(x,y)=x, g_1^{(2)}$ $(x)=2x-y, g_1^{(3)}=5x-4y$, and so on. Therefore, using an order 5 Taylor series expansion, the following result is obtained:

$$H_1x(0.1) = x(0) + 10^{-1}(2x(0) - y(0)) + \frac{10^{-2}}{2!}(5x - 4y) +$$

$$\frac{10^{-3}}{3!}(14x - 13y) + \frac{10^{-4}}{4!}(41x(\theta) - 40y(\theta))$$

$$= (1.23x(0) + 0.12y(0)) + (0.00025625x(\theta) - 0.00025y(\theta))$$

In order to obtain a bound for $g_1(x(0.1))$, we maximize $1.23x(0)+0.12y(0)$ subj. to $\Theta$ yielding a bound of 0.0 and the remainder term subject to the relaxed invariant again yields 0.0. Thus, it may be inferred that $x \leq 0$ for the time interval $[0, 0.1)$.

Thus far, we have developed a technique that lets us advance an over-approximation $\langle H, c_i \rangle$ for a time interval $[i\delta, i+1\delta)$ to obtain an over-approximation for the next time step. We now describe the computation of the initial segment for the time $[0, \delta)$ starting from $\langle H, c_0 \rangle$.

Flowpipe Approximation

For each template row $H_i$, we seek to bound the function $H_i x$ locally as an univariate polynomial of degree $m+1$. Let $a_j$, $0 \leq j \leq m$ be the result of the optimization $$a_j = \max \frac{H_i^{(j)}(x)}{j!} \; subj.to. \; x \in \langle H, c_0 \rangle$$

and let $a_{m+1}$ be the result of the optimization $$a_{m+1} = \max \frac{g_i^{(m+1)}(x)}{m+1!} \; subj.to. \; y \in \langle H, c_0 \rangle$$

Each optimization problem is an LP and can be solved efficiently. Consider the polynomial $$p(\Delta) = \sum_{j=0}^{m} a_j \Delta^j + a_{m+1}\Delta^{m+1}.$$

Lemma 8.
For $\Delta \geq 0$ and $x \in \langle H, c_0 \rangle$, $H_i x(\Delta) \leq p(\Delta)$.
Proof.

$$H_i x(\Delta) = H_i x(0) + H_i^{(1)} x(0) + \ldots + \Delta^m \frac{g^{(m)}(x(0))}{m!} + \Delta^{m+1} \frac{g^{(m+1)}(x(\theta))}{(m+1)!} \leq$$

$$a_0 + a_1 \Delta + \ldots + a_m \Delta^m + a_{m+1} \Delta^{m+1} \; \because \frac{g^{(j)}}{j!} \leq a_j \text{ and } \Delta \geq 0 \leq p(\Delta)$$

The required bound for the function $H_i x$ for the time interval $t \in [0, \delta)$ may now be approximated by maximizing the univariate polynomial $p_i(\Delta)$ over the interval $[0, \delta)$.

Maximizing Univariate Polynomials.

The maximum value of a univariate polynomial p in a time interval $[T_1, T_2]$ may be computed by evaluating the polynomial at the end points $T_1, T_2$ and the roots (if any) of its derivative p' lying in that interval. The maxima in the interval is guaranteed to be achieved at one of these points.

TABLE 3

Algorithm 3

$\langle H, c_0, inv, D \rangle$: Problem Instance.
$\langle H, c \rangle$: Invariant computed by policy iteration.
n: Taylor expansion limit, $\delta$ : time step.
function construct-flowpipe
$\langle H, d_0 \rangle$ := computeInitialFlowpipe $(0, \delta)$
{Compute the initial flowpipe for the segment $[0, \delta)$.}
while converged do
   $\langle H, d_{i+1} \rangle$ := advanceByTimeStep($\langle H, d_i \rangle$) $\delta \cap \langle H, c \rangle$
   if$\langle H, d_{i+1} \rangle$ = 0 or $\langle H, d_{i+1} \rangle \subseteq \langle H, d_i \rangle$ then
     return $d_0, \ldots, d_i$ {The flowpipe has been fully constructed}
   end if
end while
end function {construct flow-pipe}

With reference to Table 3, Algorithm 3, listed therein, shows a basic flowpipe construction scheme in accordance with an implementation of the present principles. Given an instance of the flowpipe problem along with the solution of the policy iteration algorithm, an initial flowpipe segment $\langle H, d_0 \rangle \supseteq \Im[0, \delta)$ may be determined by computing univariate polynomials, one per template row, that upper bound the Taylor series and in turn finding the maxima of these polynomials. This initial flowpipe segment is then advanced by using set integration, as described above. Let $d_0, \ldots, d_N$ be the results of running the Algorithm 3 on a given instance.

Theorem 7.

The disjunction $\vee_{i=0}^{N} \langle H, d_i \rangle$ is a sound over-approximation of all the time trajectories starting from $\langle H, c_0 \rangle$ and evolving according to the vector field D inside the invariant $\langle H, inv \rangle$.

Figure 3:
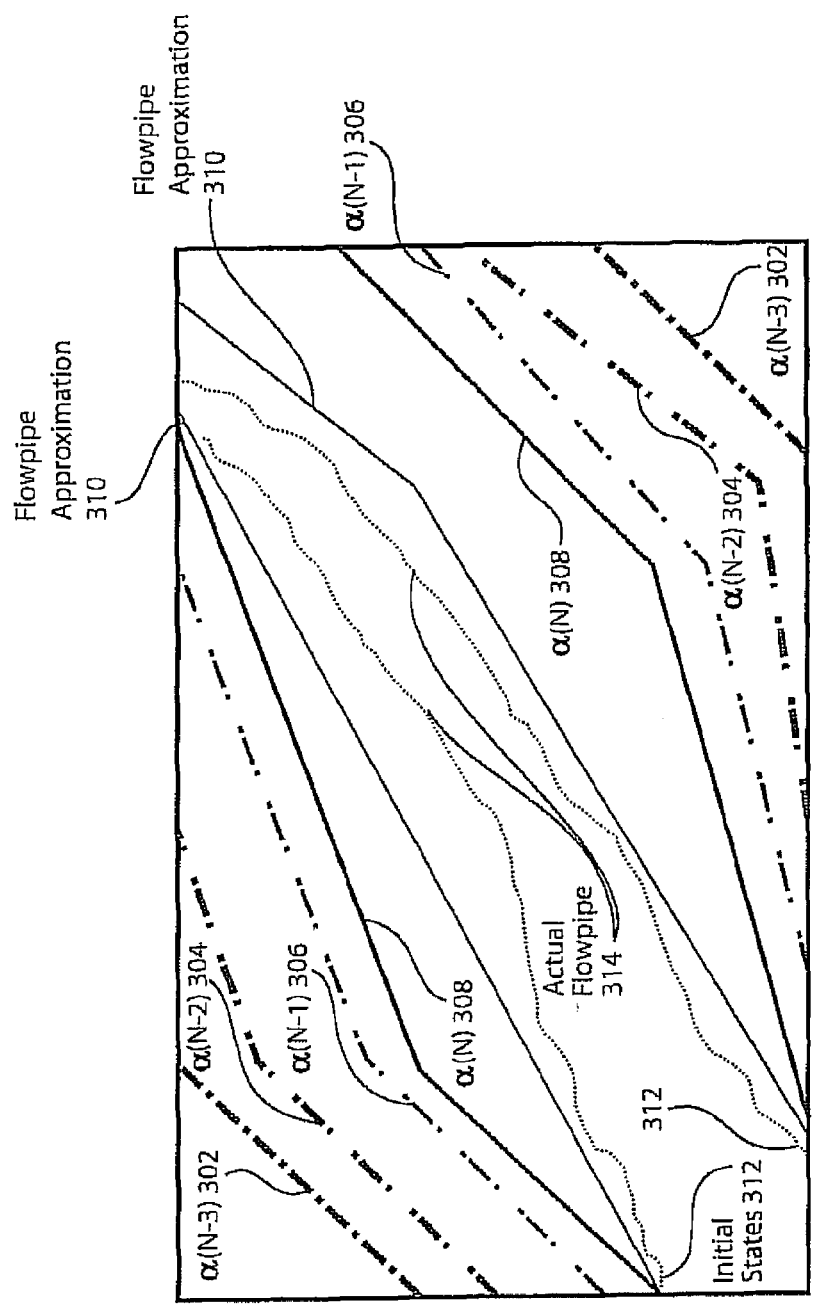
FIG. 3 is a high-level diagram illustrating the construction of a flowpipe of template polyhedra in accordance with aspects of the present principles.

With reference to FIG. 3 and continuing reference to FIG. 1, a high-level diagram illustrating the construction of a flowpipe 310 in accordance with an implementation of the present principles discussed above is depicted. In FIG. 3, region 314 represents an actual flow pipe of states of a hybrid system reachable from initial conditions 312. The constructed flowpipe 310 is a refined over-approximation of reachable states of the actual flowpipe 314. As discussed above with respect to step 104, policy iteration is employed to successively determine relaxed invariants. Regions 302, 304, 306 and 308 respectively correspond to relaxed invariants $\alpha(N-3)$, $\alpha(N-2)$, $\alpha(N-1)$ and $\alpha(N)$, discussed above with respect to step 104, where $\alpha(N)$ is a converged relaxed invariant. The flowpipe region 310 is constructed using the relaxed invariants as discussed above with respect to step 106.

Referring to FIGS. 2 and 3 with continuing reference to method 100 of FIG. 1, policy iteration may optionally be reinitialized to obtain an improved approximation of reachable states by using a bound of the flowpipe and determining an improved relaxed invariant. For example, the initial flowpipe constructed in step 106 may be utilized as the input template polyhedra expressions employed during policy iteration to obtain an improved relaxed invariant in accordance with the methods described above with respect to step 104. The improved relaxed invariant represents an improved approximation of reachable states.

At step 110, an inner flowpipe may optionally be constructed based on the improved relaxed invariant obtained from the reinitialized policy iteration to refine the improved approximation of reachable states. For example, the improved relaxed invariant may correspond to the converged relaxed invariant $\alpha(N)$, or, equivalently, $\langle H, c \rangle$, with which the improved inner flow pipe may be constructed in accordance with the methods discussed above with respect to step 106. Here, as compared to the initial flowpipe 310, the inner flowpipe represents a closer, refined and improved approximation of the actual flowpipe 314.

At step 112, it is determined whether the improved approximation of reachable states, which may be represented by the flowpipe constructed in step 110 or step 104, is sufficient. If they are sufficient, then the method may end or the reachable states may be further processed in step 114. If the approximation of reachable states is not sufficient, then step 108 and/or step 110 may be repeated. The reinitialization iteration may be performed until convergence or after a specified number of iterations has been completed. Alternatively or additionally, the sufficiency of the approximation may be determined in accordance with the application for which the determined reachable states are employed.

For example, at step 114, the determined reachable states may be employed to perform one or more of: verification of whether the hybrid system meets safety specifications by comparing reachable states in the flowpipe to the safety specifications; computation of likely paths leading to property violations of a hybrid system; instantiation of parameters in a system description to guarantee safe operation; and/or generation of finite state models of an infinite state hybrid system. If the determined reachable states are employed to verify whether safety specifications are met, for example, then the reinitialization iteration may end when the determined reachable states fall outside of unsafe regions or do not intersect unsafe regions. However, it should be understood that other conditions for ending the reinitialization iteration. For example, the reinitialization iteration may be performed until one of convergence or an application condition occurs. The conditions for ending the reinitialization iteration may be provided, for example, by the verification unit 210 in the form of sufficiency information 212. Alternatively, the flow pipe module 208 or a controller (not shown) may derive the conditions for ending the reinitialization iteration based on sufficiency information 212 provided by verification unit 210.

Additionally, with regard to step 114, it should be noted that the determined reachable states employed in step 114 may be any of the reachable states determined, after one or more iterations, at any one of steps 106, 108 and 110.

Having described preferred implementations of a system and method for automatically determining the reachable states of a hybrid system (which are intended to be illustrative and not limiting), it is noted that modifications and variations can be made by persons skilled in the art in light of the above teachings. For example, the methods and systems described above may be applied to general hybrid systems by approximating or abstracting them using a linear hybrid system. In addition, methods and systems described may be implemented with Simulink™ or Stateflow™ or related models that are mathematically equivalent or may be converted into a hybrid system representation. It is therefore to be understood that changes may be made in the particular implementations disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A system for automatically determining reachable states of a hybrid system utilizing template polyhedra, constructed in part using linear template expressions, comprising:
 a processor to execute an expression generation module configured to generate a set of template polyhedra expressions from a system description;
 a policy iteration unit configured to employ policy iteration to produce an over-approximation of states reachable by the hybrid system from the expressions in the form of a relaxed invariant; wherein the hybrid system includes discrete and continuous systems that handle ordinary differential equations;
 obtaining over-approximation of reachable states over infinite time horizons and using the over-approximations of reachable states over infinite time horizons to prune the over-approximations of reachable states over finite time horizons;
 applying a linear programming solver at each step to derive the template polyhedral of over-approximations for finite as well as infinite horizons; and
 a flowpipe module configured to construct a flowpipe of template polyhedra based on the relaxed invariant obtained from policy iteration to refine the over-approximation of reachable states and thereby determine the reachable states of the hybrid system;
 wherein for each template $(H_i, c_0, i)$ of a given template $(H, c)$, the flowpipe approximate seeks to bound the function $H_i x + c_0, i$ locally as an univariate polynomial of a chosen degree m, where the coefficients of the polynomial $a_j$ $0 \leq j \leq m$ are a result of solving an optimization problem $$a_j = \max \frac{H_i^{(j)}(x)}{j!} subj.\ to.\ x \in \langle H, c_0 \rangle.$$

2. The system of claim 1, wherein the policy iteration unit is further configured to reinitialize policy iteration to obtain an improved approximation of reachable states by using a bound of the flowpipe and determining an improved relaxed invariant.

3. The system of claim 2, wherein the flowpipe module is further configured to construct an inner flowpipe based on the improved relaxed invariant obtained from the reinitialized policy iteration to refine the improved approximation of reachable states.

4. The system of claim 1, wherein the flowpipe module is further configured to advance an approximation for a time interval by applying a series expansion over template expressions to generate a flowpipe segment.

5. The system of claim 4, wherein the flowpipe module is further configured to truncate the series expansion and is further configured to employ the relaxed invariant to bound a remainder term of the series expansion.

6. The system of claim 1, further comprising:
 a verification unit configured to verify whether the hybrid system meets safety specifications by comparing reachable states in the flowpipe to the safety specifications.

7. The system of claim 1, further comprising:
 a verification unit configured to employ the determined reachable states to compute likely paths leading to property violations of the hybrid system.

8. The system of claim 1, further comprising:
 a verification unit configured to employ the determined reachable states to instantiate parameters in the system description and thereby guarantee safe operation.

9. The system of claim 1, further comprising:
 a verification unit configured to employ the determined reachable states to generate finite state models of the hybrid system.

10. The system claim 1, wherein each optimization is a linear programming problem used to construct the polynomial $$p(\Delta) = \sum_{j=0}^{m} a_j \Delta^j + a_{m+1} \Delta^{m+1}$$

for a time step $\Delta \geq 0$ chosen by the user such that for a given template $H$, $c_0$ the polyhedron formed by $H_i x \leq p(\Delta)$ is a bound function $H_i x + c_0, i$ at time $t = \Delta$ and furthermore the polyhedron formed by $H_i x \leq \max_{t \in [0,\Delta]} p(t)$ is a bound for the function $H_i x + c_0, i$ over the time interval $t \in [0, \Delta]$.

* * * * *